Jan. 6, 1959

T. BARDEEN ET AL 2,867,779

SEISMOGRAPH FILTER SYSTEMS

Filed Nov. 14, 1955

INVENTORS
Thomas Bardeen
And Irving C. Zacher.
BY

ATTORNEY:-

United States Patent Office 2,867,779
Patented Jan. 6, 1959

2,867,779

SEISMOGRAPH FILTER SYSTEMS

Thomas Bardeen, Fox Chapel, and Irving C. Zacher, Cheswick, Pa., assignors to Gulf Research & Development Company, Pittsburgh, Pa., a corporation of Delaware Application November 14, 1955, Serial No. 546,706

4 Claims. (Cl. 333—70)

This invention relates to seismograph prospecting apparatus, and in particular concerns seismograph prospecting amplifier filter systems which are adjustable as to frequency characteristic.

Certain aspects of this invention are disclosed and claimed in copending applications Serial Nos. 546,707 and 546,708 assigned to the same assignee as the present application.

In seismograph prospecting, a charge of explosive is fired so as to produce earth tremors which are observed at one or more points spaced from the explosive source of earth vibration. In the so-called reflection shooting type of operation, the wave energy from the source penetrates downwardly into the earth and is reflected from underground strata, interfaces, fault planes, etc. The pulses received at the observing position are converted into electrical energy by means of a geophone, and the electrical signals are amplified and recorded for subsequent analysis and interpretation. Due to the fact that the reflected impulses undergo considerable attenuation in the course of their travel from the source down to the reflecting horizon and up to the geophone, their amplitude is often times not far greater than the background noise level. The noise level arises from near-surface disturbances caused directly or indirectly by the shot, or from more or less continuous background noise due to wind, traffic, and other natural and artificial causes. It is well known to employ filters in seismograph amplifiers to improve the reflection signal-to-noise ratio.

This invention relates to an improved seismograph filter system. It has been found from common experience that reflections from various horizons at different parts of the earth have certain characteristic frequencies, usually lying in the range 15 to 80 cycles per second. Accordingly, seismograph filters have been made adjustable so that the operator may conveniently set the filter to an optimum value in this range to record the desired reflections. It has also been found desirable to employ a band-pass type of filter.

There are certain difficulties inherent in the adjustment of a band-pass filter if a reasonable or practical amount of switching is to be maintained. This difficulty has been circumvented in part by employing plug-in units which are changed each time it is desired to change the recorded frequency. This is obviously a cumbersome and time consuming expedient and requires much duplication of expensive equipment. Due to the low frequency of seismograph operations, filter components are commonly adjusted by switching, i. e., by switching more or less condensers in circuit, or by switching taps on the inductance coils in circuit. There are usually two or more such components to be switched and this requires multiple switching. An important difficulty results from the fact that as the filter frequency is changed it is also necessary to change the commonly employed filter termination resistance in order that the shape of the frequency characteristic curve of the filter shall remain similar and not develop peaks or trailing cut-offs. One of the purposes of this invention is to remedy this difficulty. For purposes of this invention similar shape means substantially the same sharpness of cut-offs and flatness of plateau over the pass band. By the term "frequency characteristic" is meant the curve of steady-state response amplitude versus frequency for a sinusoidal input signal of constant amplitude in the substantially-undistorted operating range. By the term "sharpness of cut-off" is meant the slope of the frequency characteristic at the cut-off frequency.

It is an object of this invention to provide a filter circuit the shape of whose frequency characteristic is independent of frequency adjustment.

It is a further object of this invention to provide a band-pass filter circuit whose frequency characteristic may be adjusted by adjusting capacity in the circuit but without substantially altering the shape of the frequency characteristic.

It is a further object of this invention to provide a band-pass filter circuit whose frequency characteristic may be adjusted by adjusting the inductance in the filter circuit but without altering the shape of the frequency characteristic.

It is a further object of this invention to provide a filter circuit whose frequency characteristic may be adjusted at will in a continuous manner without changing the shape of the frequency characteristic.

These and other useful objects of this invention are accomplished as described in this specification, of which the drawings form a part, and in which Figure 1 is a wiring diagram of a filter circuit of this invention employing adjustable capacities;

This invention comprises a band-pass type of filter whose frequency characteristic is made substantially independent of frequency adjustment by connecting a resistor in parallel with the series-tuned condenser and a resistor in series with the parallel-tuned inductance, said resistors having resistances respectively such that the total effective terminating resistance of the filter follows the desired relationship with frequency as to maintain the shape of the filter's frequency characteristic independent of the midfrequency adjustment.

Figure 1:
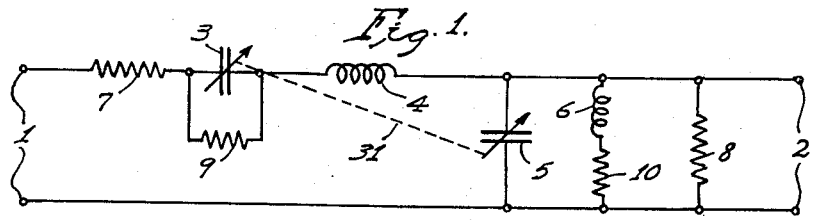

Referring to Figure 1 there is shown a band-pass filter unit comprising series-tuned condenser 3 and inductance 4, together with parallel-tuned condenser 5 and inductance 6. The terminating resistors commonly employed in a band-pass filter circuit of this type are resistor 7 in series with the series-tuned elements, and resistor 8 in parallel with the parallel-tuned elements. Input to the filter is applied at terminals 1 and output is delivered at terminals 2. In order to adjust the mid-frequency of the band-pass filter of the type shown, condensers 3 and 5 may be made adjustable and these adjustments must be made simultaneously in such manner as to maintain the desired degree of tuning for both the series-connected circuit and the parallel-connected circuit. Due to the low frequency employed in seismograph recording the adjustments to condensers 3 and 5 must be made by switching in or out of circuit additional capacity, and inasmuch as the adjustments must be made simultaneously the switches must be mechanically interconnected as shown by the dotted line 31. The function of resistors 9 and 10 shown in Figure 1 is to maintain the shape of the frequency characteristic of the filter independent of its midfrequency adjustment as will be explained fully later.

Figure 2:
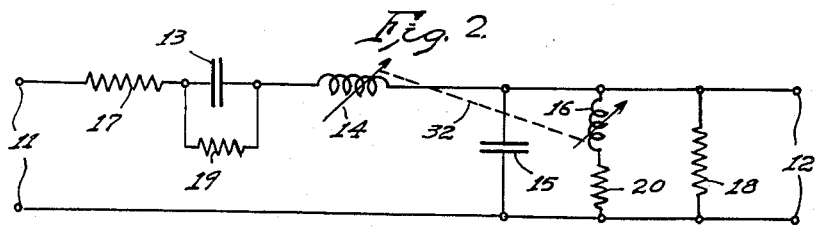
Figure 2 is a wiring diagram of a filter circuit of this invention employing adjustable inductances.

Figure 2 shows an embodiment of the invention wherein a band-pass type of filter circuit is adjusted by adjusting the inductances. The circuit comprises a series-tuned condenser 13 and inductance 14 together with parallel-tuned condenser 15 and inductance 16. The inductance adjustment is made by changing taps on the coil and the tap-changing switches are mechanically interconnected by the connection 32. The resistors 17 and 18 are connected as shown, input to the filter being at terminals 11 and output at terminals 12. The function of resistors 19 and 20 shown in Figure 2 is to maintain the shape of the frequency characteristic of the filter independent of its midfrequency adjustment as will be explained fully later.

Figure 3:
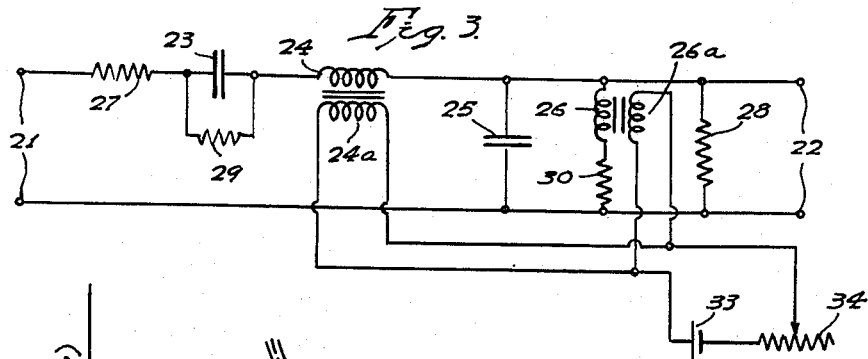
Figure 3 is a wiring diagram of a filter circuit of this invention employing continuously adjustable inductances.

Figure 3 shows a schematic wiring diagram of a band-pass filter circuit of a type similar to that shown in Figures 1 and 2, but in which frequency adjustment is accomplished by varying the inductances in a manner which permits a high degree of flexibility and which avoids the difficulties of multiple switching. The band-pass filter comprises series-tuned condenser 23 and adjustable inductance 24 together with parallel-tuned condenser 25 and adjustable inductance 26. Input and output terminals are 21 and 22 respectively and the resistors 27 and 28 are connected as shown. The function of resistors 29 and 30 shown in Figure 3 is to maintain the shape of the transmission characteristic of the filter independent of its midfrequency adjustment as will be explained fully later.

The inductances 24 and 26 of Figure 3 are saturable-core reactors and the respective cores of these inductances are provided with control windings 24a and 26a respectively. By passing a D.-C. current through the windings 24a and 26a it is possible to vary the flux density in the core of the respective inductance and in this manner control the incremental permeability of the core at the operating point. Inasmuch as the incremental permeability decreases with an increase in flux density, it is thus possible to control the inductances 24 and 26. In order to prevent transfer of energy from the coil 24 to the coil 24a and from coil 26 to coil 26a, each respective inductance is actually formed of a pair of inductances connected in series opposition with respect to a common control coil, i. e., a humbucking connection is employed. The control windings 24a and 26a are connected in parallel to a battery 33 through variable resistor 34. By adjusting the resistor 34 one may adjust the currents in the control coils 24a and 26a and in this manner control the midfrequency adjustment of the filter unit. The reactors 24 and 26 preferably have similar core characteristics so that by adjusting the resistor 34 the proper current is passed through the respective coils 24a and 26a in order to maintain the desired degree of tuning for the series-tuned circuit 23 and 24, as well as for the parallel-tuned circuit 25 and 26. By employing the circuit of Figure 3 the midfrequency of the filter may be varied in a smooth and continuous manner over the entire range of adjustment. A range of frequency adjustment of from 15 to 80 C. P. S. is easily attainable with commercially-available saturable-core reactors.

The function of resistors 9 and 10, 19 and 20, 29 and 30, will now be described and explained. In a band-pass filter of the type shown in Figures 1, 2 and 3, the shape of the filter characteristic depends on the total effective terminating resistances. In the Fgures 1, 2 and 3, the resistors 7 and 8, 17 and 18, 27 and 28, respectively, form part of the total effective terminations, but other loss factors also play an important part.

The following well-known equation expresses the relationship of the proper terminations to other design factors. For the circuit of Figure 1, $K^2 = R_1 R_2 / W_0^2 L_1 L_2$ and for the circuit of Figures 2 and 3, $K^2 = W_0^2 C_1 C_2 R_1 R_2$ where $K^2$ is a constant, $W_0$ is $2\pi$ times the midfrequency (in C. P. S.) of the band-pass filter, $L_1$ and $C_1$ are the series-tuned inductance and capacity respectively, $L_2$ and $C_2$ are the parallel-tuned inductance and capacity respectively, $R_1$ is the total effective input termination, and $R_2$ is the total effective output termination.

It is apparent that the proper terminations $R_1$ and $R_2$ may be made equal by suitable choice of capacities and inductances so that $R = R_1 = R_2$. Thus by way of example for Figures 2 and 3 the above equation gives $R = \sqrt{K^2 / W_0^2 C_1 C_2}$ or $R \alpha 1 / w_0$. By assigning a value to $K^2$, we can compute the desired relationship and an example is plotted as curve 36 of Figure 4. The curve 36 is computed for $K^2 = 1:18$ which value has been found desirable for use in seismograph prospecting filters. A curve similar to 36 can of course be computed for any desired value of K. The curve 36 shows how $R = R_1 = R_2$ should vary for the band-pass type of filter circuit shown in Figures 1, 2 and 3 as the midfrequency is changed by changing condensers 3 and 5, inductances 14 and 16, or inductances 24 and 26 respectively.

In the series-resonant part of the circuit of Figure 3, for example, the total effective termination R includes in complex combination the resistances 27, 29 and the various losses in the inductance 24. These will be designated hereafter simply as $R_{27}$, $R_{29}$ and $R_{24}$ respectively. In the parallel-resonant circuit the total effective termination R includes in complex combination the resistances $R_{28}$, $R_{30}$, and $R_{26}$. In the filter circuit of Figure 3, the resistors 27 and 28 do not vary with the midfrequency adjustment of the filter. It has already been pointed out however that $R_{24}$ and $R_{26}$ vary with frequency because of variable core losses, so that the dependency of R on its three components is very complex. Losses in the condensers are so small as to be negligible.

Figure 4:
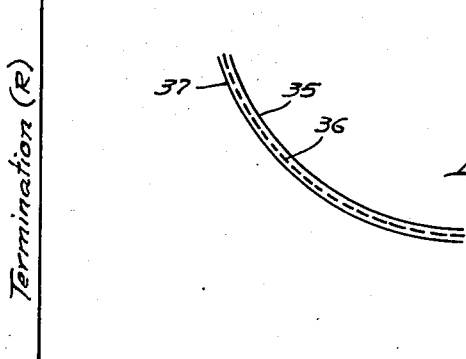
Figure 4 shows a graph of the variation of filter termination with frequency.

In this invention use is made of the discovery that a resistor 9, 19 or 29 can be connected in parallel with the series-tuned condenser and can be chosen so that R (the total effective termination) for the series-resonant circuit follows substantially the desired relationship with respect to $W_0$, and that a resistor 10, 20 or 30 can be connected in series with the parallel-tuned inductance and can be chosen so that R for the parallel-resonant circuit also follows substantially the desired relationship with respect to $W_0$, this relationship being depicted by the curve 36 of Figure 4. The contribution of $R_9$, $R_{19}$ or $R_{29}$ to the series-resonant circuit's R varies with $W_0$ because of the way it is connected in the circuit, and the contribution of $R_{10}$, $R_{20}$ or $R_{30}$ to the parallel-resonant circuit's R varies with $W_0$ also because of the way it is connected in the circuit, but in a different manner from that of $R_9$, $R_{19}$ or $R_{29}$.

Because of the extreme complexity with which the various resistance contributions are related, it is difficult to compute the required values of the resistances 9, 19 or 29 and 10, 20 or 30 for the respective figures, but it is simple to determine experimentally the value of these resistors that respectively is required to give the desired curve of R against $W_0$. The fit can be made quite good for circuits whose inductances have a $$Q\left( = \frac{WL}{R} \right)$$

of 8 or more.

By way of example, consider first the series-tuned part of the circuit of Figure 3 comprising elements 27, 23, 29, 24 with its control coil 24(a) connected as shown in the left half of Figure 3. The value of $R_1$ (which is the value of R pertaining to this part of the circuit) is obtained experimentally at any tuned frequency by connecting this part of the circuit in series with a calibrated variable resistor and an A. C. source of calibrated frequency. With the circuit tuned, by adjustment of the oscillator frequency or the inductance-control current or both, the variable resistor is adjusted until the voltage measured across the circuit is equal to the voltage across the variable resistor with zero phase between the two voltages. The value of the variable resistor for this condition is the measure of $R_1$, this being a well-known experimental procedure. The value of inductance 24 is then changed by changing the control current in 24($a$) and the above procedure is repeated at as many other tuned frequencies as desired. In this manner a curve of observed $R_1$ against frequency is obtained. This curve should fit the curve 36 of Figure 4 and the values of resistors 27 and 29 are chosen to give an optimum fit. It is found that a good fit is obtainable after a little experimentation.

The above-described experimental procedure is then repeated with the parallel-tuned part of the circuit of Figure 3 comprising the elements 28, 25, 30, 26 with its control coil 26($a$), connected as shown in the right half of Figure 3. The procedure gives a curve of $R_2$ (which is the value of R pertaining to this part of the circuit) against frequency. This curve should also fit the curve 36 of Figure 4 and the values of resistors 28 and 30 are chosen to give an optimum fit. It is found that a good fit is obtainable after a little experimentation.

For the circuits of Figures 1 and 2, similar procedures will give similar results. In the case of Figure 1 the tuning is varied by changing the adjustment of condensers 3 and 5 obtaining the curves of $R_1$ and $R_2$ respectively, and the resistors 7 and 9, and 8 and 10 are chosen respectively to give the best fit. In the case of Figure 2, the procedure is as described above for Figure 3 except that the inductances are varied in the tests by changing taps on their respective coils, and in this manner the curves of $R_1$ and $R_2$ against frequency are obtained, with resistors 17 and 19, and 18 and 20 chosen respectively to give the best fit.

The curves 35 and 37 show actual fits that have been obtained for the circuit of Figure 3. Actual values obtained were as follows:

| $f_0$ | Computed $R=R_1=R_2$ | Observed $R^1$ | Observed $R_2$ |
|---|---|---|---|
| 30 cps | 40.6 kilo-ohms | 41.1 kilo-ohms | 39.5 kilo-ohms. |
| 45 cps | 27.1 kilo-ohms | 25.6 kilo-ohms | 28.0 kilo-ohms. |
| 60 cps | 20.3 kilo-ohms | 20.8 kilo-ohms | 20.1 kilo-ohms. |

The above fit was obtained with the following circuit values in Figure 3. These values are given by way of example only and not as limiting the invention.

| Component | Value |
|---|---|
| Resistor 27 | 12.3 kilo-ohms. |
| Resistor 29 | 300 kilo-ohms. |
| Condenser 23 | .0612 mfd. |
| Condenser 25 | .33 mfd. |
| Resistor 30 | 680 ohms. |
| Resistor 28 | 62 kilo-ohms. |
| Inductance 24 | Adjustable (pair of saturable-core reactors with hum-bucking coils, total D.-C. resistance 3000 ohms, high permeability core material .003" thick ribbon wound into a toroid). |
| Inductance 26 | Adjustable (pair of saturable-core reactors with hum-bucking coils, total D.-C. resistance 1600 ohms, high permeability core material .003" thick ribbon wound into a toroid). |

It is apparent from the above data that a good fit is obtained by this invention for the observed total effective termination to the desired termination required for the filter to maintain the shape of its frequency characteristic as its midfrequency is adjusted over a substantial range. This is accomplished by the circuit of this invention using fixed resistors throughout which eliminates the need for adjusting filter resistors as the midfrequency adjustment is changed. This invention makes it possible to vary the frequency adjustment of the filter continuously as desired, as disclosed and claimed in copending application Serial No. 546,708.

Inasmuch as the midfrequency $W_0^2 = W_1 W_2$, where $W_1$ is the tuned frequency of the high cut-off filter section and $W_2$ is the tuned frequency of the low cut-off filter section, it is seen that $W_1$ and $W_2$ differ from $W_0$ by the same amount. In the figures the series-tuned elements determine $W_1$ and the parallel-tuned elements determine $W_2$. It has been found that the resistors chosen to give the best fit to the curve for R (curve 36 of Figure 4) also give a satisfactory fit at other band widths. Accordingly by using the circuit of this invention the filter may be adjusted as to band width without the need for adjusting filter resistors.

We claim:

1. An electrical circuit of the band-pass type which comprises a pair of input terminals, a pair of output terminals, means connecting one input terminal to one output terminal, a first resistor and a first condenser and a first adjustable inductance connected in series between the free input terminal and the free output terminal, a second resistor connected in parallel with said first condenser, a second condenser and a third resistor connected in parallel between said output terminals, a fourth resistor in series with a second adjustable inductance connected in parallel between said output terminals, and said second and fourth resistors having resistances respectively which maintain the shape of the filter frequency characteristic as the band-pass midfrequency is changed by adjustment of said inductances.

2. An electrical filter circuit of the band-pass type which comprises a pair of input terminals, a pair of output terminals, means connecting one input terminal to one output terminal, a first resistor and a first adjustable condenser and a first inductance connected in series between the free input terminal and the free output terminal, a second resistor connected in parallel with said first condenser, a second adjustable condenser and a third resistor connected in parallel between said output terminals, and a fourth resistor in series with a second inductance connected in parallel between said output terminals, and said second and fourth resistors having resistances respectively which maintain the shape of the filter frequency characteristic as the band-pass midfrequency is changed by adjustment of said condensers.

3. An electrical circuit of the band-pass type which comprises a pair of input terminals, a pair of output terminals, means connecting one input terminal to one output terminal, a first resistor and a first condenser and a first adjustable inductance connected in series between the free input terminal and the free output terminal, a second resistor connected in parallel with said first condenser, a second condenser and a third resistor connected in parallel between said output terminals, a fourth resistor in series with a second adjustable inductance connected in parallel between said output terminals, said first and second resistors having resistance values such that the sharpness of low-frequency cut-off is substantially independent of midfrequency when the mid-frequency is changed by adjustment of said inductances, and said third and fourth resistors having resistance values such that the sharpness of high-frequency cut-off is substantially independent of midfrequency when the mid-frequency is changed by adjustment of said inductances.

4. An electrical circuit of the band-pass type which comprises a pair of input terminals, a pair of output terminals, means connecting one input terminal to one output terminal, a first resistor and a first adjustable condenser and a first inductance connected in series between the free input terminal and the free output terminal, a second resistor connected in parallel with said first condenser, a second adjustable condenser and a third resistor connected in parallel between said output terminals, a fourth resistor in series with a second inductance connected in parallel between said output terminals, said first and second resistors having resistance values such that the sharpness of low-frequency cut-off is substantially independent of mid-frequency when the mid-frequency is changed by adjustment of said condensers, and said third and fourth resistors having resistance values such that the sharpness of high-frequency cut-off is substantially independent of mid-frequency when the mid-frequency is changed by adjustment of said condensers.

References Cited in the file of this patent

UNITED STATES PATENTS

| | | |
|---|---|---|
| 2,276,873 | Rambo et al. | Mar. 17, 1942 |
| 2,661,459 | Schmidt | Dec. 1, 1953 |